(12) United States Patent
Yamaguchi

(10) Patent No.: US 6,657,712 B2
(45) Date of Patent: Dec. 2, 2003

(54) LUMINANCE MEASURING DEVICE FOR LIQUID CRYSTAL DISPLAY

(75) Inventor: Akira Yamaguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/401,562

(22) Filed: Mar. 31, 2003

(65) Prior Publication Data

US 2003/0184738 A1 Oct. 2, 2003

(30) Foreign Application Priority Data

Mar. 29, 2002 (JP) ......................................... 2002-132110

(51) Int. Cl.[7] ................................................. G01J 1/00
(52) U.S. Cl. ........................................ 356/213; 356/121
(58) Field of Search ............................... 356/213, 214, 356/218, 219, 220, 221, 222, 223, 226, 227, 228, 121, 122, 123, 124, 125, 126, 127; 250/237 R; 345/102, 207, 208

(56) References Cited

U.S. PATENT DOCUMENTS

| | | | | |
|---|---|---|---|---|
| 5,459,594 A | * | 10/1995 | Nakanishi et al. | .......... 349/187 |
| 6,459,485 B1 | * | 10/2002 | Tsurutani | .................... 356/432 |
| 6,556,284 B1 | * | 4/2003 | Leroux | ....................... 356/121 |
| 6,559,826 B1 | * | 5/2003 | Mendelson et al. | ......... 345/102 |
| 6,590,643 B2 | * | 7/2003 | Kubota et al. | .............. 356/121 |

FOREIGN PATENT DOCUMENTS

| | | | | |
|---|---|---|---|---|
| JP | 06088766 A | * | 3/1994 | .......... G01M/11/00 |
| JP | 06217239 A | * | 8/1994 | ............ H04N/5/66 |
| JP | 06222316 A | * | 8/1994 | ............ G02F/1/13 |

* cited by examiner

Primary Examiner—Frank G. Font
Assistant Examiner—Sang H. Nguyen
(74) Attorney, Agent, or Firm—Sughrue Mion, PLLC

(57) ABSTRACT

A luminance measuring device for a LCD includes a photometric unit having a contact type luminance meter, a light shielding cushion member surrounding a vicinity of a light receiving portion of the contact type luminance meter and a holding unit for fixing the contact type luminance meter to the LCD a converting unit for converting a first luminance measurement result by the contact type luminance meter into a second luminance measurement result corresponding to a telescopic luminance meter and a processing unit for conducting conversion processing using the converting unit to a luminance measurement result of the LCD by the photometric unit.

2 Claims, 3 Drawing Sheets

(A)

(B)

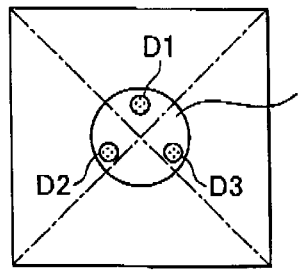
FIG.2 (A)
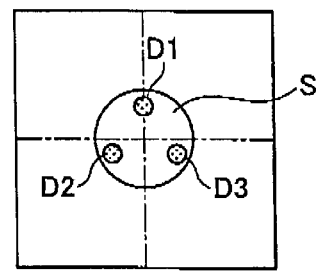
FIG.2 (B)
FIG.3
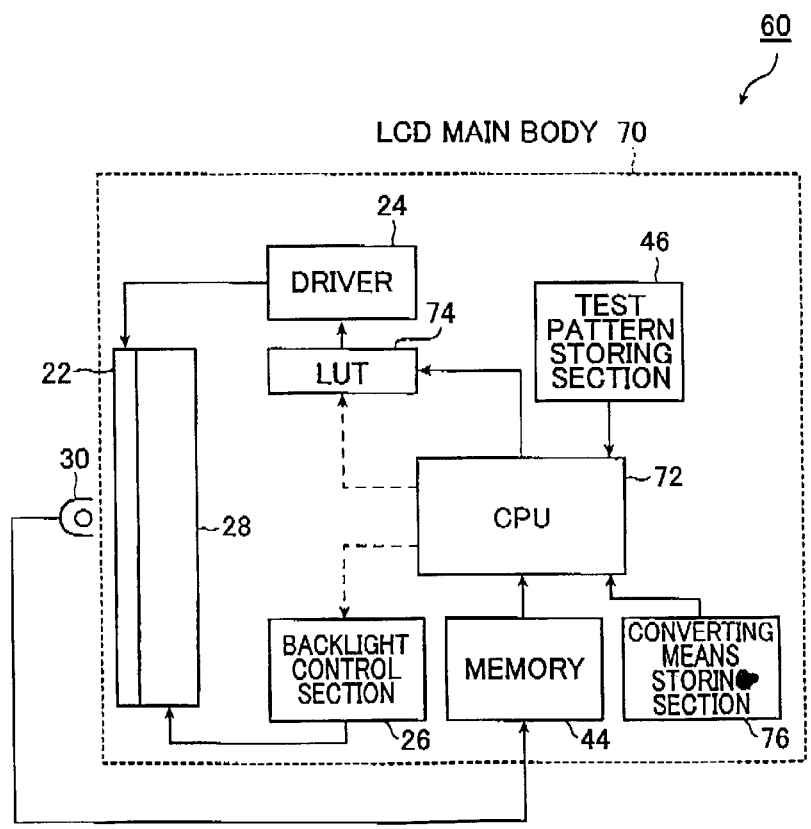

LUMINANCE MEASURING DEVICE FOR LIQUID CRYSTAL DISPLAY

BACKGROUND OF THE INVENTION

1. Field of the Invention

The present invention belongs to a technical field for measuring luminance of a liquid crystal display.

2. Description of the Related Art

As one of diagnostic methods in a medical field, a diagnosis using a diagnostic image taken by a medical measurement apparatus such as an ultrasonic diagnostic apparatus, a CT diagnostic apparatus, an MRI diagnostic apparatus, an X-ray diagnostic apparatus, or an FCR (Fuji computed radiography) is conducted. The diagnostic image is generally reproduced on a photo film. In diagnosis, the photo film is observed by setting it in Schaukasten. In addition, so-called monitor diagnosis in which the diagnostic image is managed as digital image data, and displayed on a display (electronic Schaukasten) to observe it in diagnosis comes into wide use to become general for convenience of image data management.

In such a diagnostic image, a slight density difference thereof is used as a diagnostic basis. Thus, it is very important to always display the image with adequate luminance and gray scale.

When a diagnostic image is recorded in a photo film, the gradation of the luminance (gray scale) of the image is stored in a state in which it is recorded in the photo film. Thus, during a long period for which the film is stored, an image with substantially the same quality is obtained in every observation. In contrast to this, in the monitor diagnosis, the diagnostic image is stored as digital image data and treated. Thus, when the image is displayed On a display in observation, the gradation of the luminance of the displayed image is greatly changed according to a display performance of the display to be used. In addition, even when the same display is used, there is a case where the display performance is varied by deterioration with time or the like so that image display of the same quality cannot be kept.

Therefore, when the monitor diagnosis is conducted, the check of the performance of a display by a user in advance, that is, the quality control of the display is required.

In particular, it is important to measure a luminance characteristic in order to conduct display with an adequate gradation of luminance. The luminance characteristic measurement is conducted by, for example, measuring images with various luminance levels which are displayed on the display using a luminance meter.

With respect to the luminance meter used for luminance measurement of the display, there are a non-contact type telescopic luminance meter for conducting measurement in a position distanced from the display by a predetermined distance and a contact type luminance meter for conducting measurement in contact with the display surface of the display.

The telescopic luminance meter has an optical system in the luminance meter and condenses light from a range limited by a lens. Thus, a measurement field of view can be narrowed so that it is limited to narrowness of, for example, 1 degree. On the other hand, the contact type luminance meter is attached onto the display surface of the display by a sucking disc or the like and directly receives light from the display. A measurement field of view is very wide.

In view of such a difference of structure, the telescopic luminance meter has high precision but is expensive. In contrast to this, the contact type luminance meter is commercially available at relatively low cost. Therefore, the contact type luminance meter is used for general luminance measurement of a CRT (cathode-ray tube).

In the case where display luminance of the display is measured using the above two types of luminance meters, when it is a CRT, a view angle characteristic (view angle dependence) of the CRT is small. Thus, even in the contact type luminance meter, substantially the same measurement value as the telescopic luminance meter is obtained.

However, with respect to an LCD (liquid crystal display), in view of its structure, there is a view angle characteristic, that is, a characteristic in which it appears to change display luminance and display chromaticity according to an angle at which a display screen is viewed, such as a characteristic in which it appears to be light by light leakage at an oblique view even when it is black at a front view. Thus, when measurement is conducted by the contact type luminance meter generally used for the CRT, accurate measurement cannot be conducted resulting from of a wide measurement angle of the luminance meter and the view angle characteristic of the LCD. In particular, an error in a low luminance side becomes larger due to light leakage in a black level.

FIGS. 4A and 4B show comparisons of results obtained by measuring luminance of the LCD and that of the CRT using the contact type luminance meter and the telescopic luminance meter. The abscissa indicates a measurement value in the telescopic luminance meter and the ordinate indicates a ratio of a measurement value in the contact type luminance meter to the measurement value in the telescopic luminance meter. As shown in FIG. 4B, in the case of CRT, the measurement value in the contact type luminance meter coincides with the measurement value in the telescopic luminance meter over a wide range of luminance. However, in the case of the LCD as shown in FIG. 4A, the measurement value in the contact type luminance meter is greatly shifted on a low luminance side.

Further, in the LCD, liquid crystal molecules are aligned between two electrode substrates. Thus, when a pressure is applied onto the display surface by a touch or the like, an interval between the electrode substrates is changed so that display luminance is changed. Therefore, when the contact type luminance meter is fixed to the display surface of the LCD by means of a sucking disc or the like so that the weight of the luminance meter is supported on the display surface, there is also a problem in that a suitable measurement value cannot be obtained.

As described above, in the case of the telescopic luminance meter, a suitable measurement value can be obtained even in measurement of the LCD as in the CRT. However, the telescopic luminance meter is very expensive because of the precision structure of its optical system. Thus, when the meter is used as a luminance measuring tool by a display user as in a medical institution, a burden thereto is large, which is not suitable.

SUMMARY OF THE INVENTION

An object of the present invention is to solve the above conventional problems, and therefore to provide a luminance measuring device for an LCD which can accurately measure display luminance of the LCD by an inexpensive contact type luminance meter so that, for example, a suitable calibration can be stably conducted.

In order to attain the object described above, the present invention provides a luminance measuring device for a liquid crystal display comprising:

photometric means including: a contact type luminance meter; a light shielding cushion member surrounding a vicinity of a light receiving portion of the contact type luminance meter; and holding means for fixing the contact type luminance meter to the liquid crystal display such that the light shielding cushion member lightly presses onto a display surface of the liquid crystal display and a relationship between an orientation of a light receiving portion of the contact type luminance meter and an orientation of the liquid crystal display is kept constant;

converting means for converting a first luminance measurement result by the contact type luminance meter into a second luminance measurement result corresponding to a telescopic luminance meter, the converting means previously being prepared from the first luminance measurement result by the contact type luminance meter and the second luminance measurement result by the telescopic luminance meter; and processing means for conducting conversion processing using the converting means to a luminance measurement result of the liquid crystal display by the photometric means.

Preferably, the converting means is set for each kind of liquid crystal display, and the processing means selects the converting means corresponding to one kind of liquid crystal display as a measurement subject and conducts the conversion processing.

BRIEF DESCRIPTION OF THE DRAWINGS

In the accompanying drawings:

FIGS. 2A and 2B are concept views for explaining a relationship between a polarizing axis direction of a polarizing plate of an LCD and positions of sensors of a luminance meter main body 32;

FIG. 3 is a block diagram showing a schematic construction of another embodiment of a luminance measuring device according to the present invention.

DETAILED DESCRIPTION OF THE PREFERRED EMBODIMENTS

Hereinafter, a luminance measuring device of the present invention will be described in detail with reference to preferred embodiments shown in the accompanying drawings.

Figure 1A:
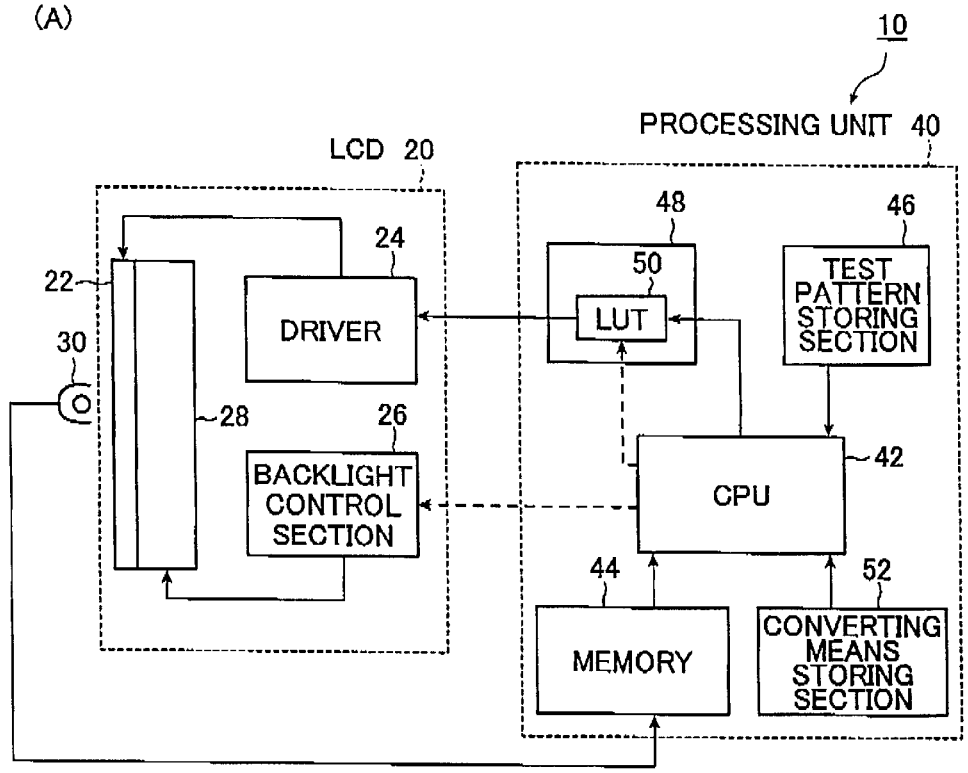
FIG. 1A is a block diagram showing a schematic construction of an embodiment of a luminance measuring device according to the present invention and FIG. 1B is a schematic side view of the luminance measuring device shown in FIG. 1A.

FIGS. 1A to 2B show a schematic construction of an embodiment of the luminance measuring device according to the present invention. Note that FIG. 1A is a block diagram showing the construction of the luminance measuring device of the present invention and FIG. 1B is a schematic side view thereof.

Figure 1B:
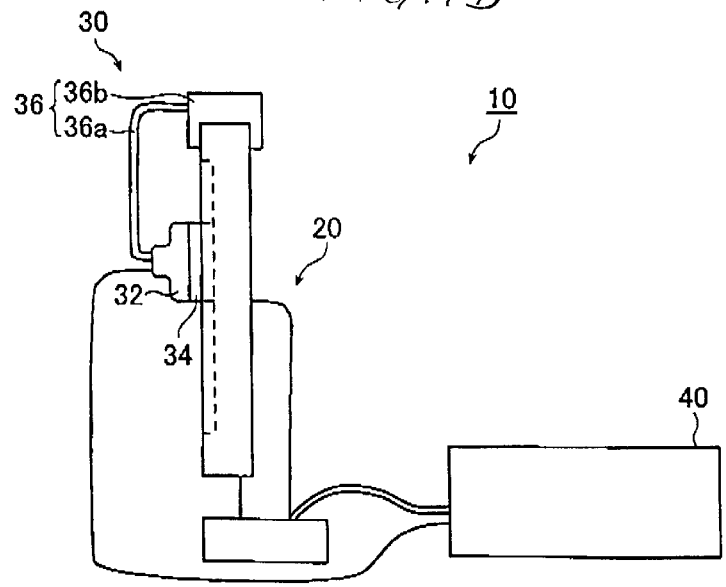
Figure 4:
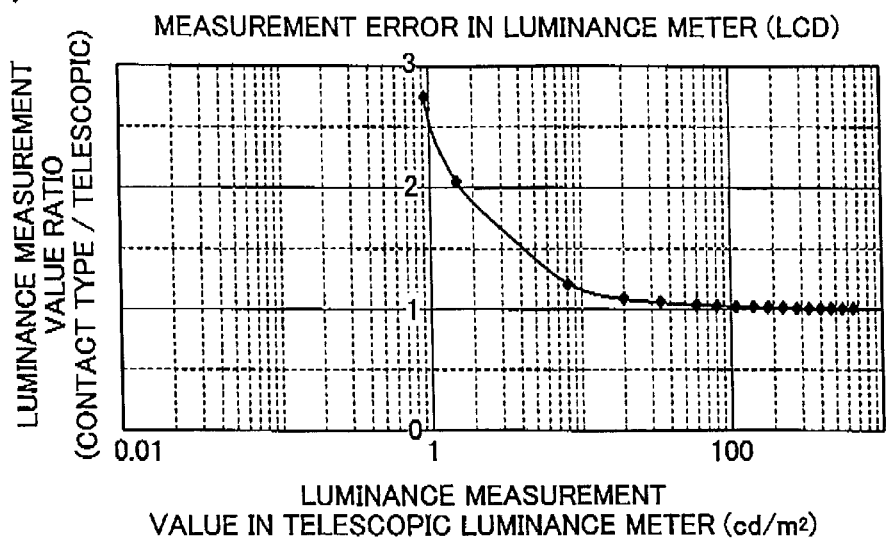
FIGS. 4A and 4B are graphs showing a difference between a measurement value obtained by a contact type luminance meter and a measurement value obtained by a telescopic luminance meter when display luminance is measured for an LCD and a CRT.
Figure 4:
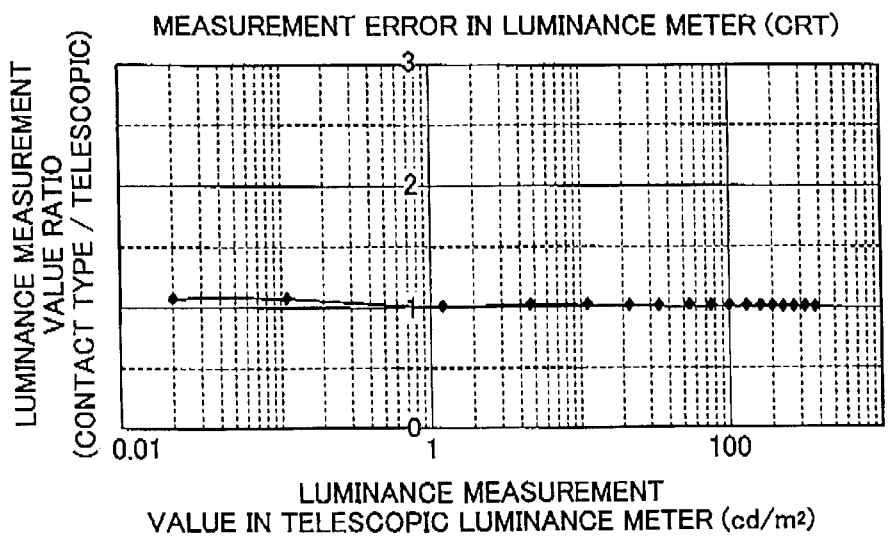

A luminance measuring device 10 shown in FIGS. 1A and 1B is a device for measuring display luminance of a liquid crystal display (hereinafter also referred to as an LCD) 20 and fundamentally includes a photometric unit 30 and a processing unit 40. According to such a luminance measuring device 10, luminance of a screen on the liquid crystal display 20 is measured by the photometric unit 30 and the measurement result is converted into a luminance value corresponding to a measurement result in the telescopic luminance meter by the processing unit 40. Thus, for example, calibration is conducted for displaying a screen at an adequate gradation of luminance on the LCD 20.

As shown in FIGS. 1A and 1B, the LCD 20 is connected with the processing unit 40 and the photometric unit 30 is also connected with the processing unit 40. The photometric unit 30 is held to the LCD 20 such that a predetermined condition described later is satisfied.

The LCD 20 is a general liquid crystal display for displaying an image by transmitting light from a backlight 28 through liquid crystal molecules aligned between two polarizing plates and has a display section 22, a driver 24 for driving the display section 22, a backlight control section 26, and the backlight 28.

The liquid crystal display 20 (display section 22) to be measured in the present invention is not particularly limited. Thus, all known liquid crystal display panels which include a glass substrate, a two-dimensional array of pixels (cells) using a liquid crystal, a modulating unit such as a TFT (thin film transistor) that modulates each of the pixels, polarizing plates arranged to sandwich the glass substrate, a black matrix, a backlight for irradiating observation light from a rear surface side (opposite surface to an observation surface), and the like are available.

Therefore, with respect to an operational mode of the display section 22, all operational modes such as a TN (twisted nematic) mode, an STN (super twisted nematic) mode, an ECB (electrically controlled birefringence) mode, an IPS (in-plane switching) mode, and an MVA (multi-domain vertical alignment) mode are available. Further, there are no limitations on a switching element and a matrix.

Image data from the processing unit 40 (video card 48) described later is supplied to the driver 24. The driver 24 drives and modulates each pixel of the display section 22 in accordance with the image data.

The amount of light of the backlight 28 is controlled by the backlight control section 26.

As shown in FIG. 1B, the photometric unit 30 includes a luminance meter main body 32, a light shielding cushion member 34, and a holding (fixing) section 36 having an arm portion 36a and a holding portion 36b.

The luminance meter main body 32 is a so-called contact type luminance meter, for example, an optical meter for measuring light incident from a light receiving portion by three photoelectric sensors and outputting tristimulus values, and measures luminance of an image displayed on the LCD 20 from the tristimulus values. As such a contact type luminance meter, for example, a commercially available contact type luminance meter such as an X-Rite DTF 92 (produced by Nippon Lithograph, Inc.) used for luminance measurement of a display is preferably utilized.

The cushion member 34 is a member which is attached to surround the light receiving portion of the luminance meter main body 32 and has a light shielding property and an elasticity. The cushion member 34 has an elasticity of the level by which the display luminance of the LCD 20 is not influenced even when the display surface of the LCD 20 is lightly pressed. When the light receiving portion of the luminance meter main body 32 is light-shielded from the outside by lightly pressing the cushion member 34 onto the display surface of the LCD 20.

Such a cushion member 34 is preferably formed by any known means, for example using a material such as a sponge into which carbon black is incorporated.

As described above, the holding section 36 has the arm portion 36a and the holding portion 36b, and the photometric unit 30 is held to the leading end of the arm portion 36a (opposite end to the holding portion 36b).

As shown in FIG. 1B, according to the above-mentioned photometric unit 30, the holding portion 36b of the holding section 36 is held to a bezel (outer frame) of the LCD 20 so that the cushion member 34 is kept in a state in which it is lightly pressed onto the display surface of the LCD 20.

Even when the cushion member 34 is pressed onto the display surface of the LCD 20, the pressing force is preferably set at a level by which the display luminance is not influenced according to the elasticity of the cushion member 34 and the like. In other words, shapes, materials, and the like of respective members of the holding section 36 are preferably set as appropriate so as to achieve this level.

Also, in the present invention, the holding section 36 holds the photometric unit 30 such that the above-mentioned pressing force condition is satisfied and a relationship between the orientation of the light receiving portion of the photometric unit 30 and that of the display surface of the LCD 20 is kept constant.

As described above, the LCD 20 has a wide view angle characteristic so that luminance is changed according to an observation direction (that is, an angle with respect to a polarization direction). On the other hand, the luminance meter main body 32 has three sensors corresponding to tristimulus values (sensors D1, D2, and D3 which are shown in FIGS. 2A and 2B as described later) and computes a luminance value from measurement values of the respective sensors.

In other words, in order that stable luminance measurement is conducted by the photometric unit 30, a positional relationship between the respective sensors and the display surface of the LCD 20 is important. When the orientation of the display surface (polarization direction) is different from that of the light receiving surface of the photometric unit 30, a luminance measurement result by the photometric unit 30 is changed.

According to the present invention, the photometric unit 30 is held on the display surface of the LCD 20 such that a relationship between the orientation of the light receiving portion of the photometric unit 30 and that of the display surface of the LCD 20 is always kept constant by the holding section 36, and converting means described later is also produced based on this positional relationship. Thus, a variation in luminance measurement result due to the view angle characteristic of the LCD 20 is eliminated so that accurate luminance measurement by the photometric unit 30 is made possible.

The processing unit 40 composes a portion of the measuring device of the present invention and supplies image data to the LCD 20 (driver 24). It preferably is composed of, for example, a personal computer or a work station. In addition, it may compose a portion of s medical diagnostic apparatus such as a CT diagnostic apparatus, an MRI diagnostic apparatus, an X-ray diagnostic apparatus, or an FCR.

In the embodiment shown in the drawings, the processing unit 40 includes a CPU 42, a memory 44, a test pattern storing section 46, a video card 48 for supplying image data to the LCD 20, and a converting means storing section 52. In addition, a lookup table (LUT) 50 for conducting image data conversion so as to display an image with adequate luminance corresponding to image data on the LCD 20 is incorporated in the video card 48.

The processing unit 40 outputs image data for displaying an image on the LCD 20 and a test pattern for luminance calibration, and conducts calibration in which luminance measurement data from the photometric unit 30 is received and converted into a luminance value corresponding to a measurement result by a telescopic luminance meter, and then an image is displayed with an adequate gradation of luminance on the LCD 20.

The test pattern storing section 46 is a site for storing a test pattern for calibrating the LCD 20.

In the present invention, all test patterns used for calibrating a display are available. For example, a 17-points gray scale step pattern, an SMPTE pattern, and the like are indicated as examples.

The converting means storing section 52 is a site for storing the converting means for conducting the conversion of a luminance measurement result of the LCD 20 which is obtained by the photometric unit 30. The converting means is used to convert a luminance measurement value (hereinafter referred to as measurement luminance) by the photometric unit 30 into a luminance measurement value (hereinafter referred to as standard luminance) corresponding to a standard luminance measurement result by the telescopic luminance meter, produced in advance, and stored in the converting means storing section 52.

The converting means is an LUT (hereinafter referred to as correction LUT) in which, when the luminance of a display image on the LCD 20 is measured by a telescopic luminance meter and the photometric unit 30 in a state in which the orientation of the light receiving portion and that of the display surface of the LCD 20 are set to have the above-mentioned predetermined relationship, and measurement luminance is converted (corrected) into standard luminance from the measurement result using any known means such as linear interpolation by a square approximation method. Note that the converting means is not limited to the LUT and may be an arithmetic expression for conducting such conversion.

Note that, for example, a color luminance meter CS-100A (produced by Minolta Co., Ltd.) or the like is used as the telescopic luminance meter.

According to the luminance measuring device of the present invention, as described above, the cushion member 34 and the holding section 36 are provided to the luminance meter main body 32 of the photometric unit 30. Luminance measurement by the luminance meter main body 32 is made possible such that the display luminance of the LCD 20 is not influenced by external light and a pressing force. In addition, the orientation of the light receiving portion of the photometric unit 30 and that of the display surface of the LCD 20 are kept constant, the correction LUT is produced in this state, and measurement luminance is converted into standard luminance using the correction LET. Thus, luminance of the LCD 20 can be measured by an inexpensive contact type luminance meter.

Therefore, for example, the calibration of the LCD is made possible in medical settings or the like so that the quality control of the LCD can be simply conducted at low cost.

The converting means storing section 52 may store only the correction LUT corresponding to one kind of LCD. In the embodiment shown in the drawings, correction LUTs corresponding to plural kinds of LCDs are stored in advance, and then a corresponding correction LUT is fetched by the CPU 42 according to a kind of LCD to be used and measurement luminance is converted into standard luminance.

As shown in FIGS. 2A and 2B, the polarizing axis of the polarizing plate of the LCD includes two kinds of directions, that is, an oblique direction (FIG. 2A) and an orthogonal direction (FIG. 25) with respect to the display screen. Thus, in the present invention in which the photometric unit 30 is composed such that the light receiving surface of the luminance meter main body 32 (corresponding to "S" in the drawings) always has a constant relationship as described above with respect to the display surface, as shown in FIGS. 2A and 25, a relationship between positions of the sensors D1, D2, and D3 of the luminance meter main body 32 and the direction of the polarizing axis is changed according to the polarizing axis direction of the LCD. In addition, the view angle characteristic of the LCD is changed according to an operational mode of the LCD.

Accordingly, plural kinds of correction LUTs corresponding to various LCDs are produced as the converting means and stored in the converting means storing section 52. Even when a combination of the processing unit 40 and the LCD 20 is changed, luminance measurement can be conducted without complicated operation such as an exchange of the converting means in the converting means storing section 52.

Hereinafter, luminance measurement by the luminance measuring device 10 will be described using an example of calibration of the LCD 20, and the processing unit 40 will be described in more detail.

First, the photometric unit 30 is held to the bezel of the LCD 20. In this state, when an instruction for conducting calibration is inputted, the CPU 42 fetches a test pattern (image data) from the test pattern storing section 46 and outputs it to the video card 48. In the video card 48, the test pattern data is converted by the LUT 50, outputted to the driver 24 of the LCD 20, and displayed on the display section 22 by the driver 24.

When the test pattern is displayed on the display section 22 of the LCD 20, the photometric unit 30 (luminance meter main body 32) measures the luminance of the LCD 20.

A measurement result of luminance, that is, measurement luminance is transferred to the memory 44 of the processing unit 40 and stored therein.

In parallel to the above processing, the CPU 42 fetches a correction LUT corresponding to the LCD 20 from the converting means storing section 52. Note that a kind of LCD 20 may be inputted from the outside by an operator, or may be determined using an identification signal outputted from the LCD 20 to the processing unit 40 by any known means.

When the measurement luminance is stored in the memory 44, it is fetched by the CPU 42 and converted by the correction LUT to be used as standard luminance.

As described above, the luminance measurement of the LCD cannot be conducted with high precision in a conventional contact type luminance meter. In contrast to this, the standard luminance is a value obtained by converting measurement luminance measured in a state in which the photometric unit 30 using the contact type luminance meter is brought in contact with the display surface of the LCD 20 such that the display luminance of the LCD 20 is not influenced by external light and a pressing force and the orientation of the light receiving portion of the photometric unit 30 and that of the display surface of the LCD 20 are always kept constant, using a correction LUT produced in this state. Thus, this is a luminance measurement result of the LCD by the contact type luminance meter but is a luminance measurement result of the LCD 20 with high precision corresponding to a measurement result by the telescopic luminance meter used for high precision adjustment of a display or the like.

When the measurement luminance is converted into the standard luminance, the CPU 42 compares the image data of the test pattern with the standard luminance and conducts at least one of the correction of the LUT 50 and the adjustment of luminance of the backlight 28 (output of an instruction signal to the backlight control section 26) such that the display luminance of the LCD 20 becomes an adequate luminance corresponding to the image data. Note that arithmetic operations for the correction of the LUT 50 and the adjustment of luminance of the backlight may be conducted by a known method used for the calibration of a display.

Here, the standard luminance corresponds to the measurement result by the telephoto type luminance meter or the like as described above. Thus, this calibration is high precision calibration conducted for obtaining an accurate luminance measurement result.

Note that, in this embodiment, the test pattern is a pattern such as a 17-points gray scale step pattern, in which a screen with predetermined luminance is displayed on the entire portion or a portion of the display section 22 and a screen with different luminance is displayed with the lapse of time. In addition, the luminance meter main body 32 of the photometric unit 30 is held to a point of the display section 22 and then the luminance of the display section 22 is measured. However, the present invention is not limited to this. A pattern such as an SMPTE pattern in which the gradation of the luminance is changed in a screen may be displayed as the test pattern 46 on the display section 22 and the luminance meter main body 32 may be slid on the display section 22 according to the luminance change pattern to measure a plurality of luminance levels.

According to the above embodiment, the luminance measuring device 10 of the present invention and the LCD 20 are separately constructed. However, the present invention is not limited to this. The luminance measuring device of the present invention may be integral with the LCD into one unit. Such an image display device having the luminance measuring device of the present invention is constructed as, for example, a portion of a medical measurement apparatus.

FIG. 3 shows this embodiment. The embodiment shown in FIG. 3 share a large number of members with the luminance measuring device shown in FIG. 1 described above. Thus, the same symbols are provided for the same members and the description will be mainly made with respect to different portions.

As shown in FIG. 3, an image display device 60 includes the photometric unit 30 and an LCD main body 70. The LCD main body 70 has the display section 22, the driver 24, the backlight control section 26, the backlight 28, the memory 44, the test pattern storing section 46, a CPU 72, an LUT 74, and a converting means storing section 76.

The CPU 72 controls the entire LCD main body 70. The operation in the calibration is the same as that of the CPU 42 of the processing unit 40 in the luminance measuring device 10 of the above-mentioned embodiment.

Also, the LUT 74 is similar to the LUT 50 in the processing unit 40 of the above-mentioned embodiment, and is an LUT for conducting image data conversion so as to display an image with adequate luminance corresponding to image data on the LCD main body 70.

The converting means storing section 76 is similar to the converting means storing section 52 in the processing unit 40 of the above-mentioned first embodiment, and is a site for storing a correction LUT as the converting means for conducting the conversion of a luminance measurement result of the LCD main body 70 which is obtained by the photometric unit 30.

In the above-mentioned first embodiment, the converting means storing section 52 stores correction LUTs corresponding to plural kinds of LCDs 20, selects a correction LUT corresponding to a kind of LCD to be used, and converts measurement luminance into standard luminance using the selected correction LUT. However, in this embodiment, the converting means storing section 76 stores only a correction LUT corresponding to the display section 22 of the LCD main body 70. The CPU 72 fetches the correction LUT and converts measurement luminance into standard luminance.

However, even in the integrally formed type, the converting means storing section 76 may store correction LUTs corresponding to plural kinds of LCDs. According to this, for example, even when the display section 22 of the LCD main body 70 is exchanged, it is easily adaptable without the exchange of the converting means storing section 76.

While the bright measuring device of the present invention has been described in detail, the present invention is not limited to the above embodiments, and it is needless to mention that various improvements and modifications may be made without departing from the spirit of the present invention.

As described above in detail, according to the present invention, luminance measurement of a liquid crystal display using an inexpensive contact type luminance meter can be conducted with high precision with which measurement by a telescopic luminance meter can be made.

What is claimed is:

1. A luminance measuring device for a liquid crystal display comprising:

photometric means including: a contact type luminance meter; a light shielding cushion member surrounding a vicinity of a light receiving portion of the contact type luminance meter; and holding means for fixing the contact type luminance meter to the liquid crystal display such that the light shielding cushion member lightly presses onto a display surface of the liquid crystal display and a relationship between an orientation of a light receiving portion of the contact type luminance meter and an orientation of the liquid crystal display is kept constant;

converting means for converting a first luminance measurement result by the contact type luminance meter into a second luminance measurement result corresponding to a telescopic luminance meter, said converting means previously being prepared from the first luminance measurement result by the contact type luminance meter and the second luminance measurement result by the telescopic luminance meter; and processing means for conducting conversion processing using the converting means to a luminance measurement result of the liquid crystal display by the photometric means.

2. The luminance measuring device according to claim 1, wherein said converting means is set for each kind of liquid crystal display, and said processing means selects said converting means corresponding to one kind of liquid crystal display as a measurement subject and conducts said conversion processing.

* * * * *